(12) United States Patent
Capitaneanu

(10) Patent No.: US 12,523,384 B2
(45) Date of Patent: Jan. 13, 2026

(54) SYSTEMS AND METHODS FOR OPTIMIZING CONTROL OF AN AIR HANDLING UNIT (AHU) TO MINIMIZE ELECTRICAL AND THERMAL ENERGY CONSUMPTION OF THE AHU

(71) Applicant: Schneider Electric Industries SAS, Rueil-Malmaison (FR)

(72) Inventor: Stefan Capitaneanu, Limours (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 743 days.

(21) Appl. No.: 17/854,169

(22) Filed: Jun. 30, 2022

(65) Prior Publication Data

US 2024/0003568 A1   Jan. 4, 2024

(51) Int. Cl.
| | | |
|---|---|---|
| F24F 11/46 | (2018.01) | |
| F24F 3/052 | (2006.01) | |
| F24F 11/63 | (2018.01) | |
| F24F 110/10 | (2018.01) | |
| F24F 110/20 | (2018.01) | |

(52) U.S. Cl.
CPC ............. F24F 11/46 (2018.01); F24F 3/052 (2013.01); F24F 11/63 (2018.01); *F24F 2110/10* (2018.01); *F24F 2110/20* (2018.01)

(58) Field of Classification Search
CPC ............ F24F 11/46; F24F 11/63; F24F 3/052; F24F 2110/10; F24F 2110/20
USPC ........................................................ 454/271
See application file for complete search history.

(56) References Cited

U.S. PATENT DOCUMENTS

| | | | |
|---|---|---|---|
| 5,769,314 A  * | 6/1998 | Drees ...................... | F24F 3/044 62/175 |
| 6,223,544 B1 | 5/2001 | Seem | |
| 6,296,193 B1 | 10/2001 | West | |
| 6,792,767 B1 * | 9/2004 | Pargeter .................. | F24F 11/46 236/44 C |
| 8,725,300 B2 | 5/2014 | Desrochers | |
| 10,274,217 B2 * | 4/2019 | Gevelber ................. | F24F 11/74 |

(Continued)

OTHER PUBLICATIONS

European Search Report and Search Opinion dated Nov. 24, 2023 for corresponding European Application No. EP 23306016.9, 8 pages.

*Primary Examiner* — Avinash A Savani
*Assistant Examiner* — Dana K Tighe
(74) *Attorney, Agent, or Firm* — Wolf, Greenfield & Sacks, P.C.

(57) ABSTRACT

A method and system are provided to control operations of an air handling unit (AHU). The method and system involve receiving a first set point(s) of a comfort zone for defining expected environmental conditions for at least one room/space; determining a second set point(s) of a comfort supply zone of an air supply according to the first set point(s), the comfort supply zone defining expected environmental conditions for the air supply to be output from the AHU; receiving information relating to environmental conditions of available fresh air and available recycled air; and controlling the AHU to combine the available fresh air and the available recycled air to produce an air mixture of the available fresh air and the available recycled air at an air mixture ratio having environmental conditions which are nearest to the second set point(s), based on the received information.

26 Claims, 13 Drawing Sheets

(56) References Cited

U.S. PATENT DOCUMENTS

| | | |
|---|---|---|
| 10,690,362 B2* | 6/2020 | Mikulica .................. F24F 11/74 |
| 11,022,335 B2* | 6/2021 | Mowris .................. G05B 15/02 |
| 2015/0120064 A1 | 4/2015 | Malloy |
| 2017/0023269 A1 | 1/2017 | Gevelber |
| 2022/0057099 A1 | 2/2022 | Clement et al. |

* cited by examiner

- Moving to the left = deshumidification and/or cooling
- Moving to the right = heating
- More the trajectory is long, more energy is consumed (cooling and heating batteries).

SYSTEMS AND METHODS FOR OPTIMIZING CONTROL OF AN AIR HANDLING UNIT (AHU) TO MINIMIZE ELECTRICAL AND THERMAL ENERGY CONSUMPTION OF THE AHU

FIELD

The present disclosure is generally directed to an environmental management system and method, and more particularly, to a system and method for optimizing the use of fresh air by an air handling unit.

BACKGROUND

Environmental management systems may employ an air handling unit to regulate environmental conditions in a building. The air handling unit can employ heating, cooling and other components, which can consume a significant amount of energy when in use. Given the control complexity of the air handling unit (e.g., complex multivariable control), it may be difficult to improve energy efficiency of the operations of the AHU while still maintaining desired comfort levels for an environment in the building.

SUMMARY

In accordance with an embodiment, a system and method are provided for controlling operations of an air handling unit or a component(s) thereof. The system can include memory; and at least one processor. The at least one processor can be configured to: receive a first set point(s) of a comfort zone for defining expected environmental conditions for at least one room/space; determine a second set point(s) of a comfort supply zone of an air supply according to at least the first set point(s) for the at least one room/space, the comfort supply zone defining expected environmental conditions for the air supply to be output from the air handling unit; receive information relating to environmental conditions of available fresh air and available recycled air; and control the air handling unit or a component thereof to combine the available fresh air and the available recycled air to produce an air mixture at an air mixture ratio having environmental conditions which are nearest to the second set point(s), based on the received information.

In various embodiments, the at least one processor can be further configured to: determine a third set point(s) of an air mixture of fresh air and recycled air, the third set point(s) corresponding to the air mixture ratio for an air mixture having environmental conditions that are nearest to the comfort supply zone, wherein the at least one processor can control the air handling unit or component thereof to combine the available fresh air and the available recycled air to produce an air mixture of the fresh air and the recycled air at the third set point(s).

In various embodiments, the at least one processor can determine the third set point(s) based on an analysis of a mixed air curve with respect to the comfort supply zone. The mixed air curve can be determined, selected or derived according to the environmental conditions of the available fresh air and the available recycled air. The third set point(s) can correspond to an optimal supply point on the mixed air curve that is nearest to the second set point(s) of the comfort supply zone.

In various embodiments, the amount of available fresh air to be combined with the available recycled air is increased or decreased until the air mixture reaches the third set point(s), or the amount of recycled air to be combined with the available fresh air is increased or decreased until the air mixture reaches the third set point(s).

In various embodiments, the at least one processor can be further configured to: update the third set point(s) in response to changes in at least one of the comfort zone of the at least one room/space, the comfort supply zone, the available fresh air, and/or the available recycled air; and in response to the updated third set point(s), control the air handling unit or component thereof to combine the available fresh air and the available recycled to produce an air mixture at the updated third set point(s).

In various embodiments, the amount of available fresh air to be combined with the available recycled air can be increased or decreased until the air mixture has environmental conditions which are nearest to the second set point(s), or the amount of recycled air to be combined with the available fresh air is increased or decreased until the air mixture has environmental conditions which are nearest to the second set point(s).

In various embodiments, the environmental conditions, associated with the first set point(s) or comfort zone, the second set point(s) or comfort supply zone, the available fresh air, the available recycled air and/or the air mixture, can include at least a temperature (T) and a relative humidity (RH).

In various embodiments, the at least one processor can be further configured to receive, determine, calculate, estimate or derive information relating to environmental conditions of the air mixture. The at least one processor can control the air handling unit or a component thereof to combine the available fresh air and the available recycled air to produce an air mixture at an air mixture ratio having environmental conditions which are nearest to the second set point(s), based on the received information and the received, determined, calculated or derived information relating to environmental conditions of the air mixture.

In various embodiments, the at least one processor can determine the second set point(s) by computing the second set point(s) according to an air supply model and the first set point(s) of the comfort zone.

In various embodiments, the at least one processor can control an operation of an air damper or a thermal exchanger of the air handling unit to control the air mixture ratio of the available fresh air and the available recycled air to be combined.

In various embodiments, the air mixture can be heated and/or cooled by the air handling unit to produce a supply of air at the second set point(s) for the at least one room/space.

In various embodiments, the comfort zone or the first set point(s) can be set by a user, or set according to an environmental schedule for the at least one room/space.

In accordance with an embodiment, an environmental management system is provided for controlling environmental conditions for at least one room/space. The system can include an air handling unit for supplying air to the at least one room/space; and the control system as described herein.

It is to be understood that both the foregoing general description and the following detailed description are exemplary and explanatory only and are not restrictive of the invention, as disclosed or claimed. The claims should be entitled to their full breadth of scope, including equivalents.

DESCRIPTION OF THE FIGURES

The description of the various example embodiments is explained in conjunction with the appended drawings.

DISCUSSION OF EXAMPLE EMBODIMENTS

Figure 1:
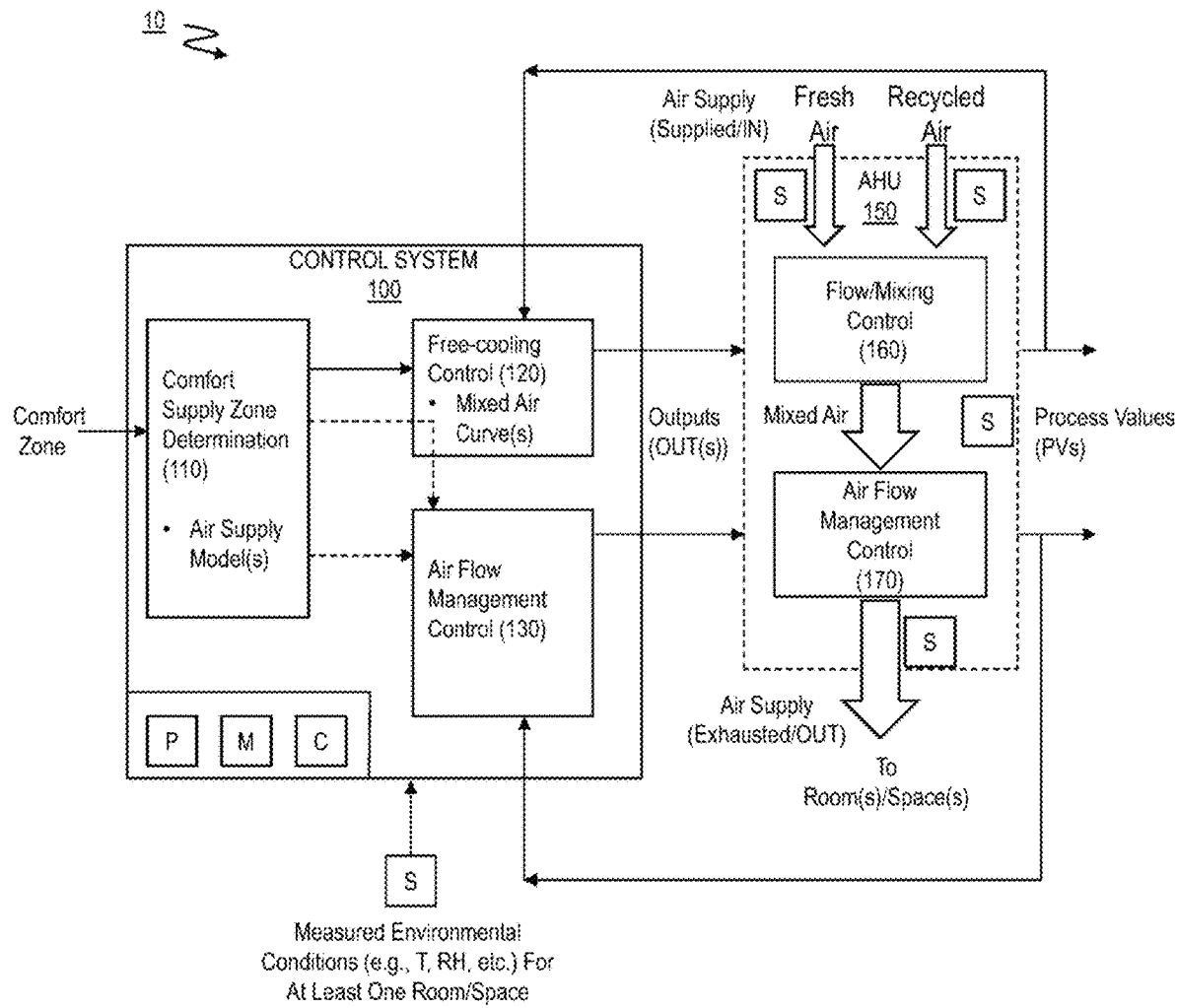
FIG. 1 is a high-level block diagram of an example environmental management system which employs an air handling unit (AHU) and a free-cooling process or algorithm ("free-cooling process") to control the operations of the AHU or components thereof to regulate environmental conditions in a room(s)/space(s) of a building or structure, in accordance with an embodiment of the present disclosure.

A method and system are provided, which can control an air handling unit (AHU) or component thereof to regulate environmental conditions for a room(s)/space(s) by using available fresh air and available recycled air. As described herein, environmental conditions can, for example, refer to temperature (T), humidity (e.g., relative humidity (RH)), air flow speed (e.g., air flow rate or amount) and/or other environmental conditions/properties. The method and system can optimize the use of available fresh air to be combined with an amount of recycled air to produce mixed air (also referred to as "air mixture") with an air mixture ratio of fresh air to recycled air having environmental conditions that are nearest (or as near as possible) to expected environmental conditions of the air to be supplied from the AHU, in order to achieve a desired environment for the room/space. The AHU also can be controlled to use heating/cooling and/or other components, which may consume energy (e.g., electrical and thermal energy), to further adapt or change the environmental conditions of the mixed air, if needed, to the expected environmental conditions of the air to be supplied from the AHU. Accordingly, the AHU can be controlled and operated to optimize the use of available fresh air, in order to minimize the use of energy consuming components, when supplying air to regulate an environment of a room(s)/space(s).

By way of further example explanation, in general, an AHU may be operated to supply air to a room/space to regulate the environment of the room(s)/space(s) to an expected comfort zone. The "comfort zone" can define expected environmental conditions of the room, and can be set by a user (e.g., user, operator, etc.) or according to an environmental schedule for the at least one room/space. For example, in some embodiments, the comfort zone and its set point(s) may correspond to a specified temperature and humidity, or range thereof. The AHU can be configured or set to supply air at an expected comfort supply zone to regulate the environment of the room(s)/space(s) to the expected comfort zone. The "comfort supply zone" can define expected environmental conditions of the air supply to be outputted (e.g., outputted, exhausted, supplied, etc.) from the AHU. For example, in some embodiments, the comfort supply zone and its set point(s) also may correspond to a temperature and humidity, or range thereof. The comfort supply zone can be determined in relation to a comfort zone. Given that various factors can impact the environment of a room(s)/space(s), an air supply model(s) can be used to determine a comfort supply zone and its set point(s) for a respective comfort zone. The air supply model(s) can be designed to take into account various factors, including but not limited to monitored environmental conditions in the room/space, monitored environmental conditions of air at different stages of the AHU (e.g., IN, mixed, OUT, etc.), the size or dimension of the room/space, the time/day, the season, geographical location of the room, the objects in the room/space (e.g., people, plants, heat/cold generating objects, etc.), and/or so forth.

In accordance with an embodiment, to reduce energy consumption and increase energy efficiency of the operations of the AHU, the control method and system of the present disclosure can incorporate and implement a free-cooling process or algorithm (also generally referred herein as "free-cooling process") to control and operate an AHU. The free-cooling process can employ available fresh air, which can be selectively combined or mixed with recycled air by the AHU or component thereof (e.g., damper, thermal exchanger, etc.), to produce a supply of mixed air at an air mixture ratio having environmental conditions that is nearest (or as close as possible) to a comfort supply zone for a specified comfort zone. An air management process also can be employed to control the AHU or components thereof to further adapt or change the environmental conditions of the mixed air, if needed, for example using heating/cooling or other components to reach or satisfy the comfort supply zone.

Furthermore, the free-cooling process can be configured to dynamically adapt to environmental or operational changes, by updating comfort supply zone or the air mixture ratio of the fresh air and recycled air. The changes can include, for example, a change to the comfort zone setting, a change to the available fresh air (or environmental conditions thereof), change to the available recycled air (or environmental conditions thereof), a change to the room environment, or others changes that may impact the free-cooling process or air supply from the AHU.

The control method and system implementing the free-cooling process can provide for various benefits and advantages. The method and system can provide for higher efficiency in the control and operation of an AHU. For example, the free-cooling process can mix fresh air with recycled air to be as near as possible to a comfort supply zone for the supplied air from the AHU, and thus, minimize the distance between the expected environmental conditions of the comfort supply zone and the environmental conditions of the resulting mixed air. This minimum distance between a comfort supply zone and the resulting mixed air can minimize consumption of energy by the AHU. That is, the free-cooling process can minimize or reduce the need to operate energy consuming components of the AHU, such as for example heating battery/heating coil, cooling battery/coiling coil, fan motor(s), humidifier/de-humidifier, etc., in order to supply air at a comfort supply zone. Furthermore, the free-cooling process can provide a simple and cost effective approach to improve energy efficiency in the control and operation of the AHU when operated to regulate an environment for a room(s)/space(s). The free-cooling process also does not require significant resources to implement, and can be easily integrated for use with existing air flow management controllers. The control block of the free-cooling process also can be implemented using a microcontroller/microprocessor.

In various embodiments, the method and system can provide for the management of two environmental control modes, such as: (1) only temperature (T° C.) set comfort zone, or (2) relative humidity/temperature (RH/T° C.) set comfort zone.

In various embodiments, the air flow management control block can be independent from the free-cooling control block. If different flow is needed by room pressures, the free-cooling control block can be auto adaptive.

In various embodiments, the control of the fresh air/recycled air flow control device, such as a damper, can be continuous (e.g., no step outputs but rather like a ramp). The control can use different user defined limits for the fresh air (e.g., 0%-100%). The speed of the air damper change also can be defined by the user (e.g., 1% per 10 minutes).

In various embodiments, the same control block for the free-cooling process may be used when a thermal exchanger (e.g., air/air or fluid exchanger) is employed, instead of a damper, to combine the fresh air with the recycled air.

In various embodiments, the free-cooling process does not need to employ extremum seeking, but rather can employ a direct convergence to the minimum energy point (e.g., optimal energy point). For example, the air mixture ratio of the fresh air and the recycled air can be increased or decreased until the mixed air reaches an optimal supply point that is nearest to a comfort supply zone. The environmental conditions of the resulting mixed air can be monitored/measured and fed back to the control process to stop increasing or decreasing the ratio when environmental conditions of the mixed air is nearest to the comfort supply zone.

The control method and system, described herein, can be implemented in a controller(s) for use in industrial control applications, such as to regulate temperature, humidity, air flow rate or other environmental conditions for one or more rooms/spaces. The industrial applications can include, but is not limited to environmental control operations and equipment (e.g., HVAC(s) or other environment control equipment in a building or facility), manufacturing operations and equipment (e.g., chemical processing plant or other manufacturing plant), or other operations and equipment. The controller can be a discrete hardware component, or a function within a large computerized control system, such as, for example, a Distributed Control Systems (DCS), Supervisory Control And Data Acquisition (SCADA), Programmable Logic Controller (PLC) or other control system.

These and other example control methods and systems of the present disclosure will be described in greater detail below with reference to the figures.

FIG. 1 is a functional block diagram of an example environmental management system 10 to regulate environmental conditions in a room(s)/space(s) of a building or structure, in accordance with an embodiment of the present disclosure. The environmental management system 10 can include a control system 100, an air handling unit (AHU) 150 and a plurality of sensors S for monitoring or measuring environmental/operating conditions in the air management process associated with the AHU 150.

As shown in FIG. 1, the AHU 150 is configured to supply air to regulate an environment of one or more rooms/spaces, such as in a building or other structure. The AHU 150 can include an air flow control device(s), such as a damper assembly (e.g., fresh air damper and/or recycled air damper) or thermal exchanger (e.g., air/air or fluid exchanger), to combine or mix available fresh air and available recycled air to produce mixed air, such as shown in the air flow/mixing control block 160. The flow control device(s) of the AHU 150 can be controlled to combine or mix the available fresh air and recycled air to produce mixed air having a desired air mixture ratio or desired environmental conditions. The AHU 150 also can include heating/cooling components, fan assembly with fan(s) and motor(s), humidifier/de-humidifier as well as other components for changing environmental conditions of the mixed air to produce a supply of air, such as shown by air flow management control block 170. These components of the AHU 150 can be controlled to change the environmental conditions of the mixed air to produce an air supply from the AHU 150 having desired environmental conditions. For example, the heating/cooling components (e.g., heating battery, cooling battery, etc.) can be used to heat and/or cool the mixed air to a desired temperature, and also can be used to vary the relative humidity of the mixed air. A humidifier/de-humidifier also can be used to vary the relative humidity of the mixed air, if greater humidity control is desired. One or more fan assemblies also can be employed to vary the air flow speed/rate thereof) of air into, through and out of the AHU 150 and components thereof. A simple example of an AHU is shown and described further below with reference to FIG. 4.

The plurality of sensors S can monitor or measure environmental/operating conditions in the air management process associated with the AHU 150. The sensors S can include temperature sensor(s) humidity sensor(s), air flow sensor(s) or other sensors to identify operating conditions of the AHU 150 and its components, and environmental conditions of the room(s)/space(s), the available fresh air, the recycled air, the mixed air, the air supply outputted from the AHU 150 and other process values (PVs) which are to be feedback to the control system 100 to facilitate control of the AHU 150.

The control system 100 can control the operations of the AHU 150 and components thereof to produce an air supply with desired environmental conditions (e.g., at a comfort supply zone or its set point(s)), in order to regulate an environment of a room(s)/space(s) to desired environmental conditions (e.g., at a comfort supply zone or its set point(s)). For example, the control system 100 can be configured to implement various functions and operations, including but not limited to a comfort supply zone determination block 110, a free-cooling control block 130, and an air flow management control block 130.

The comfort supply zone determination block 110 can determine a comfort supply zone and its set point(s) based on a comfort zone and its set point(s) for a room(s)/space(s).

The comfort zone can be set by a user or a programed environmental schedule for the room(s)/space(s). In various embodiments, the comfort supply zone can be determined for a comfort zone using an air supply model(s), which can define a relationship between a comfort zone and a comfort supply zone, according to various factors. As previously discussed, the air supply model(s) can take into account factors, including but not limited to monitored environmental conditions in the room/space, monitored environmental conditions of air at different stages of the AHU (e.g., IN, mixed, OUT, etc.), the size or dimension of the room/space, the time/day, the season, geographical location of the room, the objects in the room/space (e.g., people, plants, heat/cold generating objects, etc.), and/or so forth. In an embodiment, the set point(s) of the comfort supply zone can be computed using an air supply model according to at least the set point(s) of the comfort zone.

The free-cooling control block 120 can control, via a command signal(s) to the AHU 150 or component thereof, the air mixture ratio of available fresh air and available recycled air at which the AHU 150 is to combine or mix the available fresh air and the available recycled air, via block 160, to produce mixed air having environmental conditions that are nearest (or as near as possible) to the comfort supply zone (or set point(s) thereof). In an embodiment, the free-cooling control block 120 can utilize a mixed air curve(s) which can define a relationship between a mixed ratio of fresh air and recycled air (e.g., 0% to 100%) and resulting environmental conditions of the mixed air at the particular ratios, for defined environmental conditions of fresh air and recycled air. The mixed curve can be selected (e.g., from memory), computed, derived, or determined according to the current state of the environmental conditions of the available fresh air and the available recycled air. The free-cooling control block 120 can determine an optimal supply point (e.g., an optimal set point(s) corresponding to an optimal air mixture ratio), from the mixed curve, with an air mixture ratio that is nearest to the comfort supply zone (or its set point(s)). Thereafter, the free-cooling control block 120 can control the AHU 150 or its air flow control device(s) to combine the available fresh air and the available recycled air to produce mixed air at the optimal supply point.

In some embodiments, the free-cooling control block 120 can control the AHU 150 or its air flow control device(s) to increase or decrease the air mixture ratio until the environmental conditions of the mixed air reach or satisfy the optimal supply point (or its set point(s)). For example, the free-cooling control block 120 can employ a simple ramping approach, which employs feedback of a process value(s), to control the air flow control device (e.g., damper, etc.) to operate at the optimal supply point. For instance, the air flow control device can be initially set to operate at 0% or 100% mixture ratio (e.g., fully closed vent door or fully opened vent door), which is thereafter increased or decreased in a continuous fashion, little-by-little, over time until the monitored environmental conditions of the mixed air converges at the optimal supply point (or its set point(s)). The increase or decrease can be performed according to a ramping profile.

The above describes one example in which the free-cooling control block 120 can be implemented using mixed air curve(s) to identify an optimal supply point (e.g., its set point(s)), at which the air mixture ratio can produce mixed air having environmental conditions that are nearest to the comfort supply zone (or its set point(s)). Alternatively, the free-cooling control block 120 can be implemented without using a mixed air curve(s), but instead can increase or decrease the air mixture ratio until the environmental conditions of the mixed air reach or satisfy the comfort supply zone (or its set point(s)). This approach may further involve storing and comparing the results of environmental conditions at different air mixture ratios versus the comfort supply zone (or its set point(s)) to ascertain the optimal air mixture ratio (or its set point(s)) which is nearest to the comfort supply zone (or its set point(s)) and at which to operate the air flow control device(s) of the AHU 150.

In some embodiments, the AHU 150 can simply employ an air flow device to control the air flow of the available fresh air to be combined (e.g., fresh air damper); however, it should be understood that a desired air mixture ratio also can be achieved by controlling the air flow of the available recycled air or both the available fresh air and recycled air using air flow control device(s) (e.g., fresh air damper and/or recycled air damper).

The air flow management control block 130 can control, via a command signal(s) to the AHU 150 or components thereof, the operations of the AHU 150 and components thereof to change the environmental conditions of the mixed air, via block 170 of the AHU 150, to produce an air supply that satisfies the comfort supply point (or its set point(s)) associated with the specified comfort zone. For example, as previously described above, the AHU 150 can include heating/cooling components, fan assembly with fan(s) and motor(s), humidifier/de-humidifier as well as other components for changing environmental conditions of the mixed air to produce a supply of air, such as shown by air flow management control block 170. The air flow management control block 130 can control these components of the AHU 150 to change the environmental conditions of the mixed air to produce an air supply from the AHU 150 having desired environmental conditions.

The air flow management control 130 can control the components of the AHU 150 according to feedback information, such as for example, monitored environmental conditions of the mixed air, the outputted air supply from the AHU 150, the monitored environmental conditions of the room(s)/space(s) or other process value(s)/monitored conditions, which may impact a quality of and the air supply or an environment of the room(s)/space(s).

In this example, the control system 100 can include a processor(s) P, memory M, and communication interface(s)/device(s) C. The processor(s) P can be configured to implement the various functions and operations of the control system 100, including controlling the operations of the control system and components thereof, implementing blocks 110, 120 and 130, controlling the AHU 150 and its components, and other functions as described herein. The memory M can store various data for use in implementing the various functions and operations described herein. For example, the memory M can store air supply model(s) and other models for managing the supply of air from the AHU 150, mixed air curve(s), operating parameters for devices and systems of the environmental management system 10 (including the control system 100 and the AHU 150 and their components), application program(s), computer executable code, current and historical data of monitored/measured environmental conditions by the sensors S, and other data for implementing the functions and operations described herein. The communication interface/device C can facilitate communication with remote devices and systems, including but not limited to AHU(s) and its associated components including air flow control device (e.g., damper(s), air/air exchanger, etc.), user devices (e.g., computers, smartphones, computer tablets, etc.), and so forth. In various embodiments, the control system 100 can be a programmable logic controller (PLC) in a SCADA (supervisory control and data acquisition) system for an industrial process.

It should be understood that the above description of FIG. 1 is simply provided as an example of an environmental management system, which may employ different types of air flow control devices. For example, in some embodiments, the air flow control device can be a damper to combine available fresh air and available recycled air. Alternatively, the air flow control device can be a thermal exchanger (e.g., air/air exchanger, fluid exchanger, etc.). In this case, the thermal exchanger can be controlled in basically in the same manner as a damper or the like. However, the combination between the fresh air and the recycled air may not be direct, like when using an air damper, but instead it may be implicit: the air can be 100% fresh, and can pass via a thermal exchanger that can take only the calories from the recycled air that is 100% rejected outside in the nature. In this case, the humidity is 100% the fresh air humidity and only the temperature is a mixture between the fresh air and the recycled air. It is more about full fresh air AHU with thermal exchange with the exhausted air.

Figure 2:
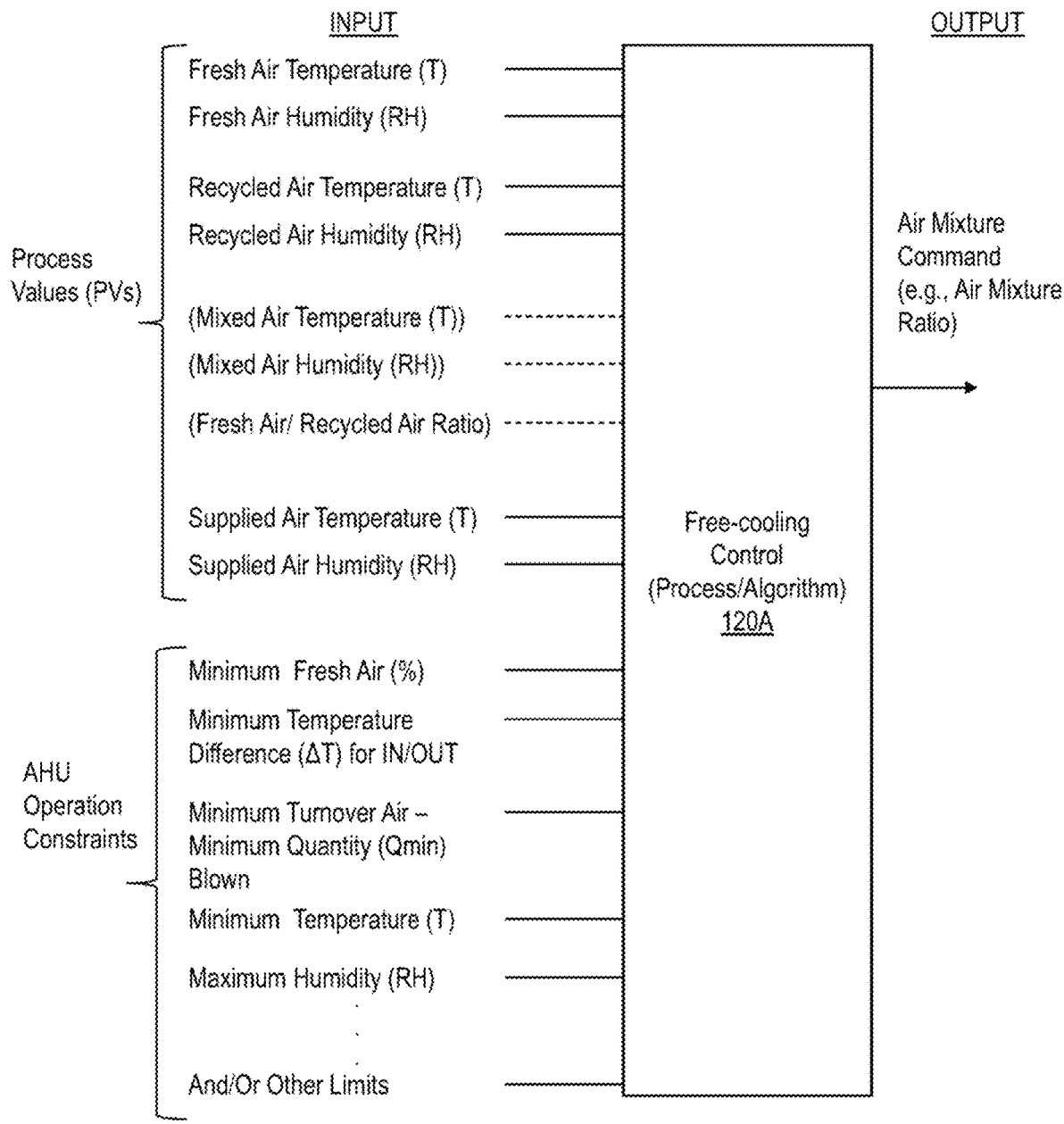
FIG. 2 is block diagram of an example control block for a free-cooling process, showing example inputs and outputs, in accordance with an embodiment of the present disclosure.

FIG. 2 is diagram of an example free-cooling control block 120A for the free-cooling process, in accordance with an embodiment of the present disclosure. As shown in FIG. 2A, the free-cooling control block 120A can be configured to receive various inputs and to output a command signal(s) to control an air mixture ratio of available fresh air and available recycled air at an AHU (e.g., 150 in FIG. 1) accordingly. In this example, the free-cooling block 120A is configured to control environmental conditions, such as at least a temperature (T) and relative humidity (T), of the mixed air at the AHU. For example, the comfort zone, comfort supply zone, supply point and/or set point(s) in this example relate to temperature and relative humidity or a range thereof.

The inputs for this control block 120A can include process values (PVs), which are feedback to the control block 120A as part of its decision-making process. The process values can include monitored/measured data from sensors, such as the fresh air temperature, fresh air humidity, recycled air temperature, recycled air humidity, mixed air temperature, mixed air humidity, supplied air temperature, and supplied air humidity.

The inputs for this control block 120 can further include constraints/limits, which may be defined or set by a user or preset in an environmental schedule for a room(s)/space(s). The constraints can, for example, include minimum fresh air (%), minimum temperature difference (ΔT) for IN/OUT of air supply for the AHU, minimum turnover air (e.g., minimum quantity (Qmin) blown air), minimum temperature, maximum humidity and/or other constraints/limits as to the air quality to be used or supplied by the AHU.

The control block 120A in FIG. 2 is provided as a non-limiting example. For example, the inputs for the mixed air temperature (T) and mixed air relative humidity (RH) can be optional, and can be replaced, for example, with the operating position of the air flow control device. For example, when a damper is employed, the operating position can be the damper position (e.g., percentage (%) opened/closed), which relates to the air mixture ratio from which environmental conditions (e.g., T and RH) of the air mixture can be determined, calculated, estimated or derived. In various embodiments, the air mixture command can be the percentage (%) opening/closing of fresh air damper.

Figure 3:
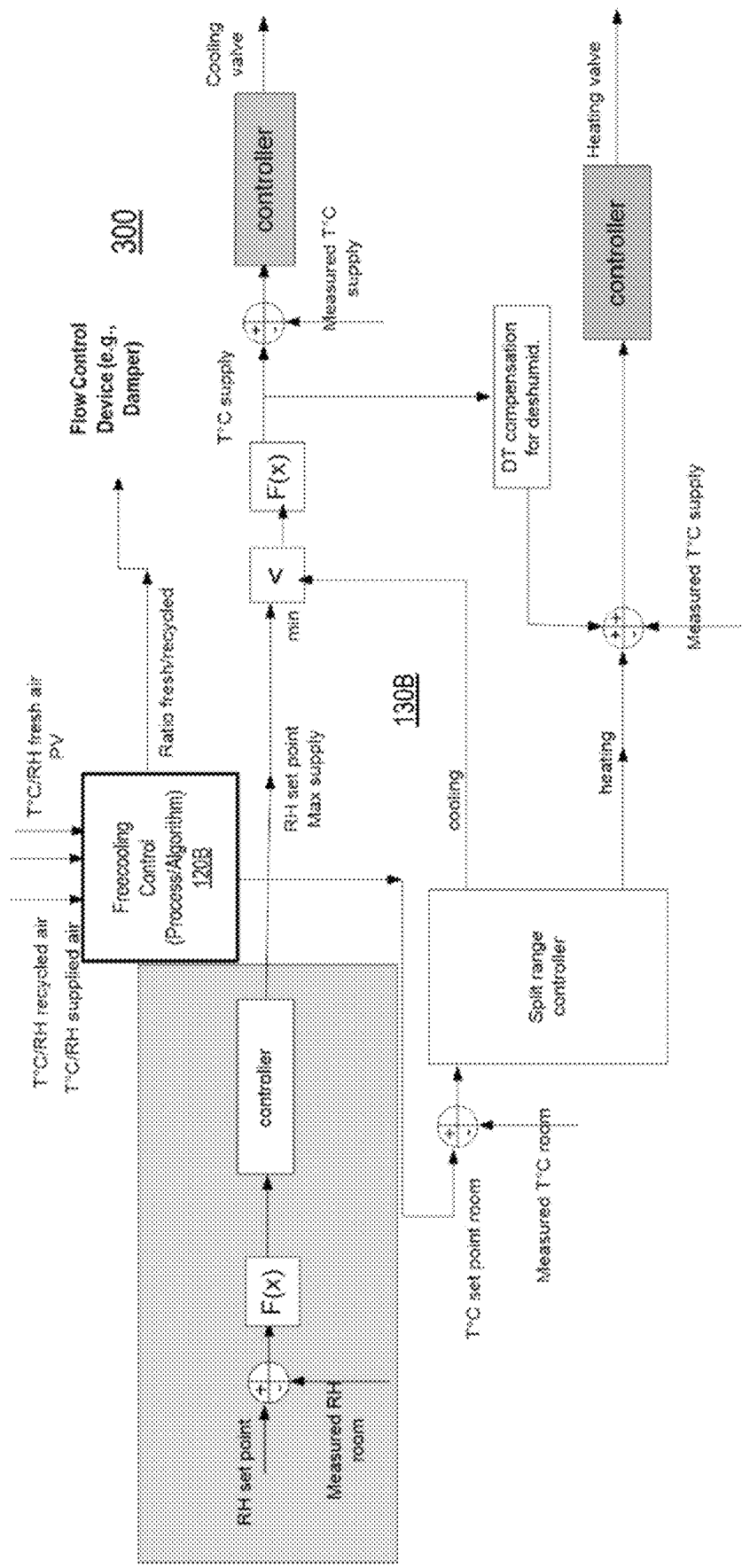
FIG. 3 is a functional block diagram of an example control system with free-cooling process control and air flow management control such as heating/cooling control, in accordance with an embodiment of the present disclosure.

FIG. 3 is a functional block diagram of an example control system 300 with a free-cooling control block 120B and other functional components of an air flow management block 130B to regulate environmental conditions of a room(s)/space(s), in accordance with an embodiment of the present disclosure. In this example, the environmental conditions to be controlled are temperature (T) and relative humidity (RH). As shown in FIG. 3, the free-cooling control block 120B can be configured to control an air flow control device (e.g., a damper(s), etc.) to combine available fresh air and available recycled air at an optimal air mixture ratio/supply point that is nearest to a comfort supply zone (or its set point(s)), according to monitored environmental conditions of the fresh air, the recycled air and the supplied mixed air. The air flow management control block 130B can employ multiple controllers, functions (F(x)) and control loop(s) to control heating and cooling components of the AHU to heat and/or cool the mixed air to produce an air supply having a desired temperature and humidity zone. The air flow management block 130B and its functional components in FIG. 3 are provided simply as a non-limiting example.

As further shown in FIG. 3, the free-cooling block 120B can be implemented as an independent or separate control process from the primary control process for an AHU, such as the air flow management control block 130B. Accordingly, the free-cooling process, as described herein, can be easily integrated to work with existing or different air flow management controllers for an AHU. In various embodiments, the free-cooling block (e.g., 120) and the air flow management control block (e.g., 130) can be implemented using different processor(s)/controller(s).

Figure 4:
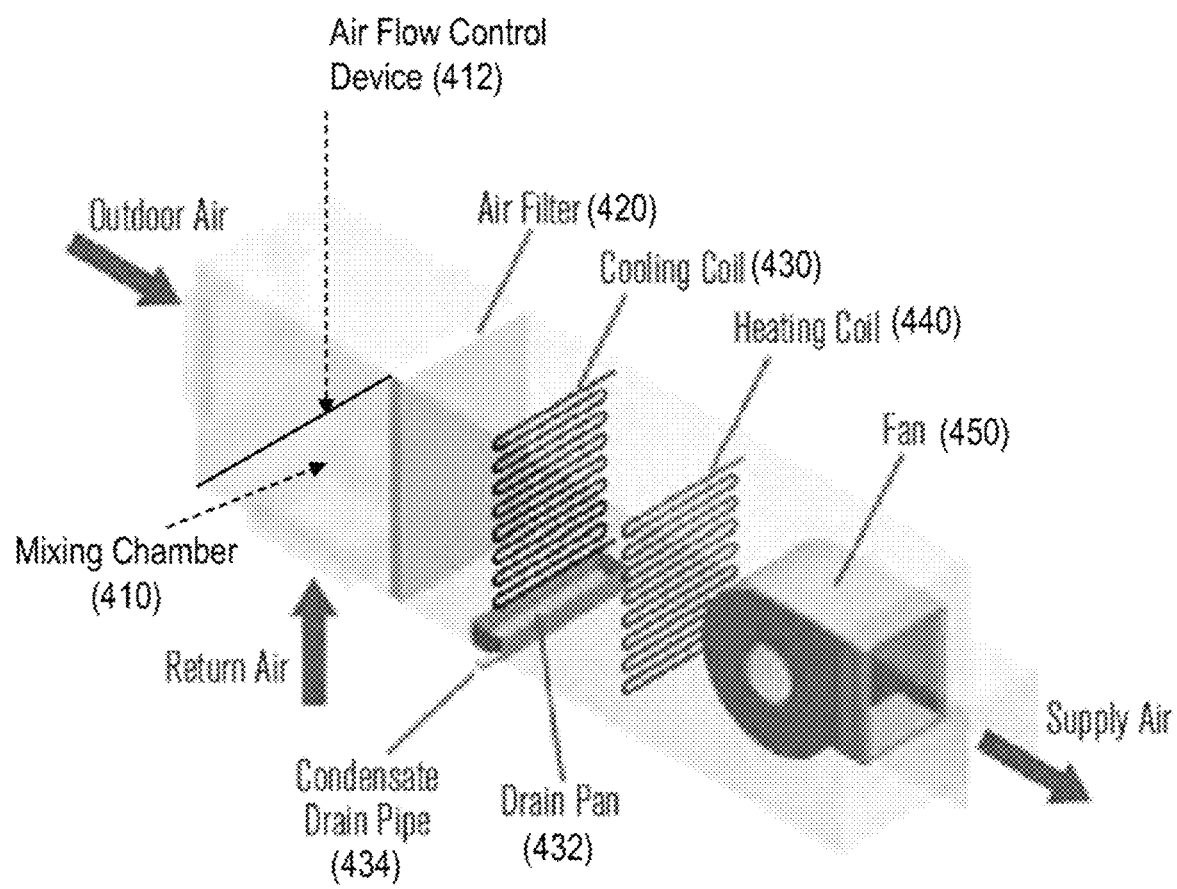
FIG. 4 illustrates example components of an AHU, in accordance with an embodiment of the present disclosure.

FIG. 4 illustrates example components of an air handling unit (AHU) 400, in accordance with an embodiment of the present disclosure. In this example, the AHU 400 can include a mixing chamber 410 for receiving available fresh air (e.g., outdoor air) and recycled air (e.g., returned air), and combining/mixing them to produce a supply of mixed air. The air flow of the fresh air can be controlled by an air flow control device 412, such as a damper, to control the air mixture ratio of fresh air to recycled air (e.g., 0% to 100%). A damper may also be provided to control the air flow of the recycled air into the mixing chamber, if desired, to enable additional control over the air mixture ratio. The AHU 400 also includes an air filter 420 for filtering the mixed air, cooling battery 430 (e.g., cooling coils) for cooling the mixed air, heating battery 440 (e.g., heating cools) for heating the mixed, and a fan (which includes a motor(s)) for blowing out the air supply at a desired air speed/rate. The AHU also can include a drain pan 432 and condensate drain pipe 434 for collecting and removing condensate produced by the cooling operation of the cooling battery 430.

Figure 5:
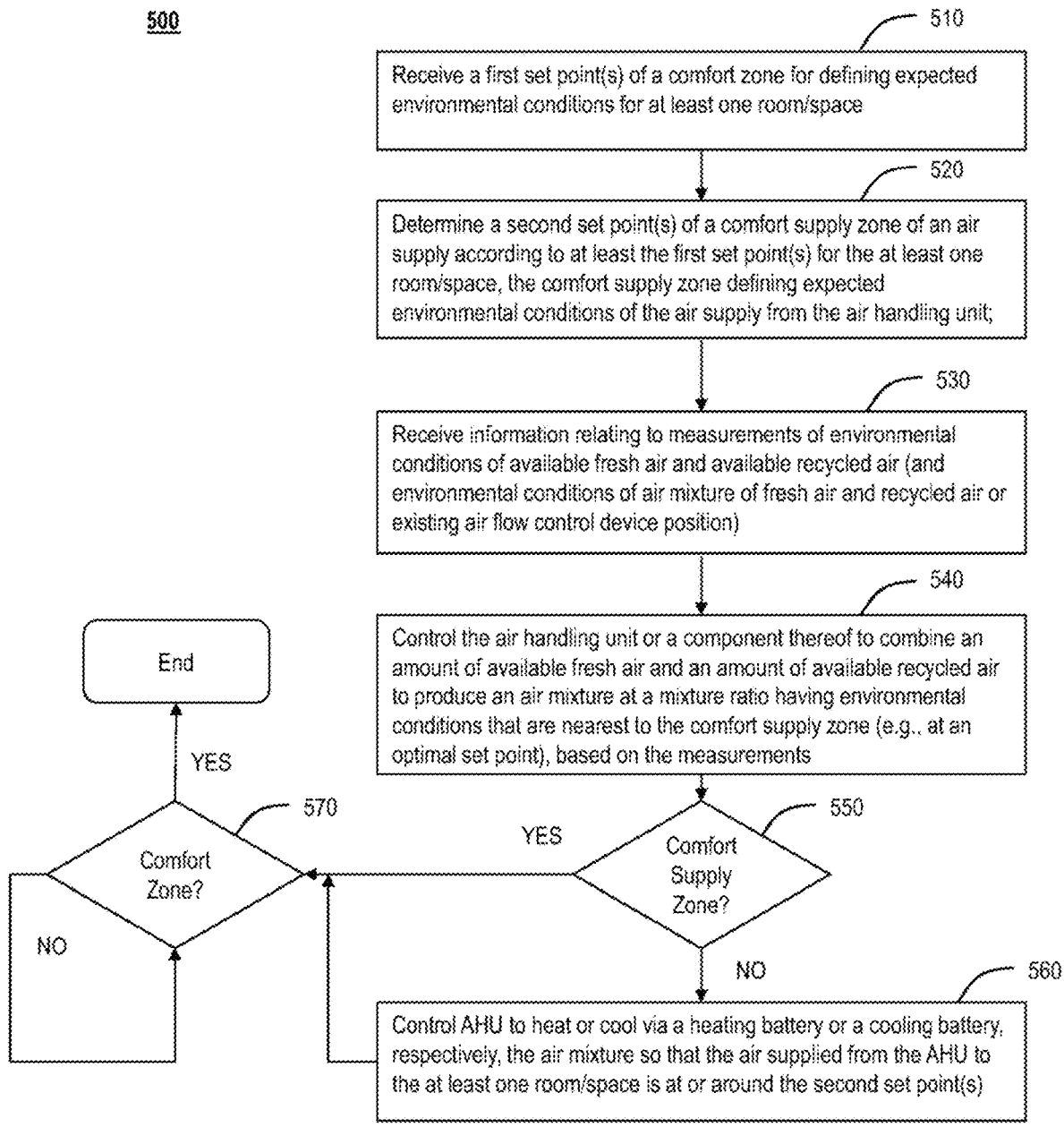
FIG. 5 illustrates an example method of controlling an operation of an AHU or components thereof using a free-cooling process, in accordance with an embodiment of the present disclosure.

FIG. 5 illustrates an example method 500 of controlling an operation of an air handling unit (AHU) or components thereof using a free-cooling process, in accordance with an embodiment of the present disclosure. For the purposes of explanation, the method 500 can be implemented by a control system (e.g., control system 100) and its components (e.g., a processor(s), etc.).

The method 500 begins at block 510 in which a first set point(s) of a comfort zone is received for defining expected environmental conditions for at least one room/space At block 520, a second set point(s) of a comfort supply zone of an air supply is determined according to at least the first set point(s) for the at least one room/space. The comfort supply zone can define expected environmental conditions of the air supply from the air handling unit.

At block 530, information relating to measurements of environmental conditions of available fresh air and available recycled air are received. The information relating to measurements of environmental conditions of air mixture of fresh air and recycled air also may be received. The measurement of environmental conditions can be monitored or taken by a plurality of sensors, to allow the control system to monitor these environmental conditions to facilitate feedback control. Further, other monitored information, as discussed herein, also can be feedback to facilitate control.

In some embodiment, instead of receiving the information relating to environmental conditions (e.g., T, RH, etc.) of the air mixture, for example, as measurements taken by sensor(s), such information can be determined, calculated, estimated or derived by the control system (e.g., the control block) from measurements (or information thereof) of the operating conditions of the air flow control device, such as for example the damper and its position. In the example of a damper, the damper position (sensed/measured by a sensor(s)) can be received, such as percentage (%) opened/closed which can relate to the air mixture ratio from which environmental conditions, such as temperature (T) and the relative humidity (RH) of the air mixture can then be estimated for given environmental conditions of the available fresh air and the available recycled air.

At block 540, the air handling unit or a component thereof is controlled, via a control signal(s), to combine an amount of available fresh air and an amount of available recycled air to produce an air mixture at an air mixture ratio having environmental conditions that are nearest to the comfort supply zone (e.g., at an optimal set point(s)), based on the measurements of the environment conditions. In some embodiments, an optimal set point(s) is determined using a mixed curve, and the air mixture ratio is thereafter increased or decreased until the optimal set point(s) is reached. In other embodiments, the air mixture ratio can be increased or decreased to provide for mixed air having environmental conditions that is nearest to the environmental conditions of the comfort supply zone (or its set point(s)).

At block 550, a determination is made whether the air mixture (or its environmental conditions) satisfies the comfort zone. If not, the AHU can be controlled, via a control signal(s), to heat or cool via a heating battery or a cooling battery, respectively, the air mixture so that the air supplied from the AHU to the at least one room/space is at the second set point(s) of the comfort supply zone.

When the air supply satisfies the comfort supply zone, the method 500 proceeds to block 570 in which the AHU can continue to supply air to the at least one room/space until the environmental conditions of the at least one room/space are at the comfort zone.

Figure 6:
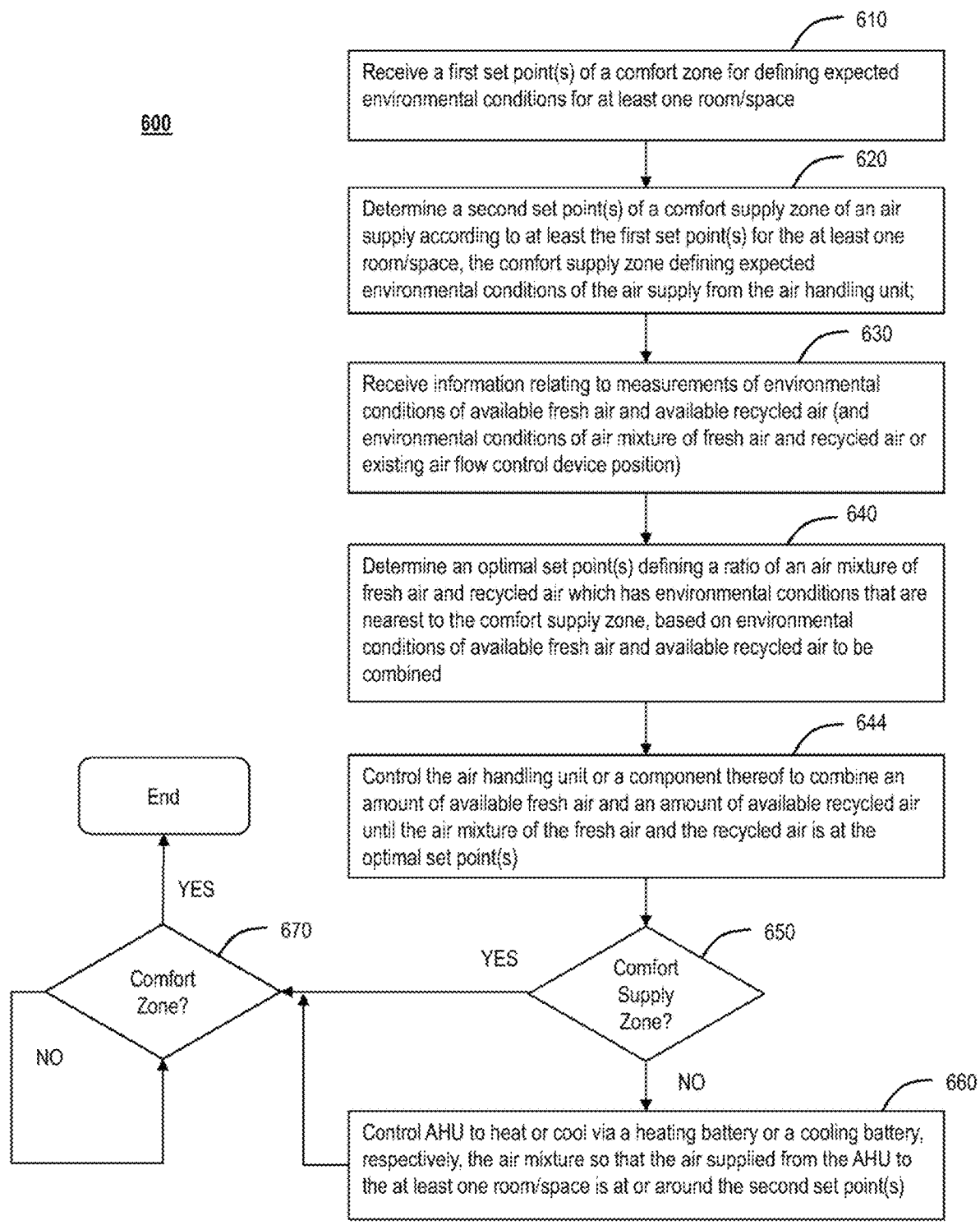
FIG. 6 illustrates an example method of controlling an operation of an AHU or components thereof using a free-cooling process, in accordance with an embodiment of the present disclosure.

FIG. 6 illustrates an example method 600 of controlling an operation of an air handling unit (AHU) or components thereof using a free-cooling process, in accordance with an embodiment of the present disclosure. For the purposes of explanation, the method 600 can be implemented by a control system (e.g., control system 100) and its components (e.g., a processor(s), etc.).

The method 600 begins at block 610 in which a first set point(s) of a comfort zone is received for defining expected environmental conditions for at least one room/space At block 620, a second set point(s) of a comfort supply zone of an air supply is determined according to at least the first set point(s) for the at least one room/space. The comfort supply zone can define expected environmental conditions of the air supply from the air handling unit.

At block 630, information relating to measurements of environmental conditions of available fresh air and available recycled air are received. The information relating to measurements of environmental conditions of air mixture of fresh air and recycled air also may be received. The measurement of environmental conditions can be monitored or taken by a plurality of sensors, to allow the control system to monitor these environmental conditions to facilitate feedback control. Further, other monitored information, as discussed herein, also can be feedback to facilitate control.

In some embodiment, instead of receiving the information relating to environmental conditions (e.g., T, RH, etc.) of the air mixture, for example, as measurements taken by sensor(s), such information can be determined, calculated, estimated or derived by the control system (e.g., the control block) from measurements (or information thereof) of the operating conditions of the air flow control device, such as for example the damper and its position. In the example of a damper, the damper position (sensed/measured by a sensor(s)) can be received, such as percentage (%) opened/closed, and can relate to the air mixture ratio from which environmental conditions, such as temperature (T) and the relative humidity (RH) of the air mixture can then be estimated for given environmental conditions of the available fresh air and the available recycled air.

At block 640, an optimal set point(s) defining a ratio of an air mixture of fresh air and recycled air is determined which has environmental conditions that are nearest to the comfort supply zone, based on environmental conditions of the available fresh air and the available recycled air to be combined. In various embodiments, the optimal set point(s) can be determined by identifying an optimal supply point on a mixed air curve that is nearest to the second set point(s) of the comfort supply zone, as described herein.

At block 644, the air handling unit or a component thereof is controlled, via control signal(s), to combine an amount of the available fresh air and an amount of the available recycled air until the air mixture of the fresh air and the recycled air is at the optimal set point(s).

At block 650, a determination is made whether the air mixture (or its environmental conditions) satisfies the comfort zone. If not, the AHU can be controlled, via a control signal(s), to heat or cool via a heating battery or a cooling battery, respectively, the air mixture so that the air supplied from the AHU to the at least one room/space is at or around the second set point(s) of the comfort supply zone.

When the air supply satisfies the comfort supply zone, the method 600 proceeds to block 670 in which the AHU can continue to supply air to the at least one room/space until the environmental conditions of the at least one room/space are at the comfort zone.

It should be understood that the method 500 of FIG. 5 and the method 600 of FIG. 6 are provided simply as examples. The control system implementing these methods can further be configured to adapt or respond to changes in the operating environment, e.g., to re-start or update the process or certain operations (e.g., blocks/functions/operations) in light of changes, for example, to: the comfort zone, comfort supply zone, environmental conditions of the available fresh air or available recycled, optimal set point(s) or other environmental or operating conditions.

FIGS. 7, 8, 9 and 10 illustrate an example implementation of the free-cooling process which is explained using illustrative diagrams of air humidity versus air temperature, in accordance with an embodiment of the present disclosure. For the purposes of explanation, in this example, the zones and set point(s) define environmental conditions, such as temperature (T) and relative humidity (RH) or a range thereof.

Figure 7:
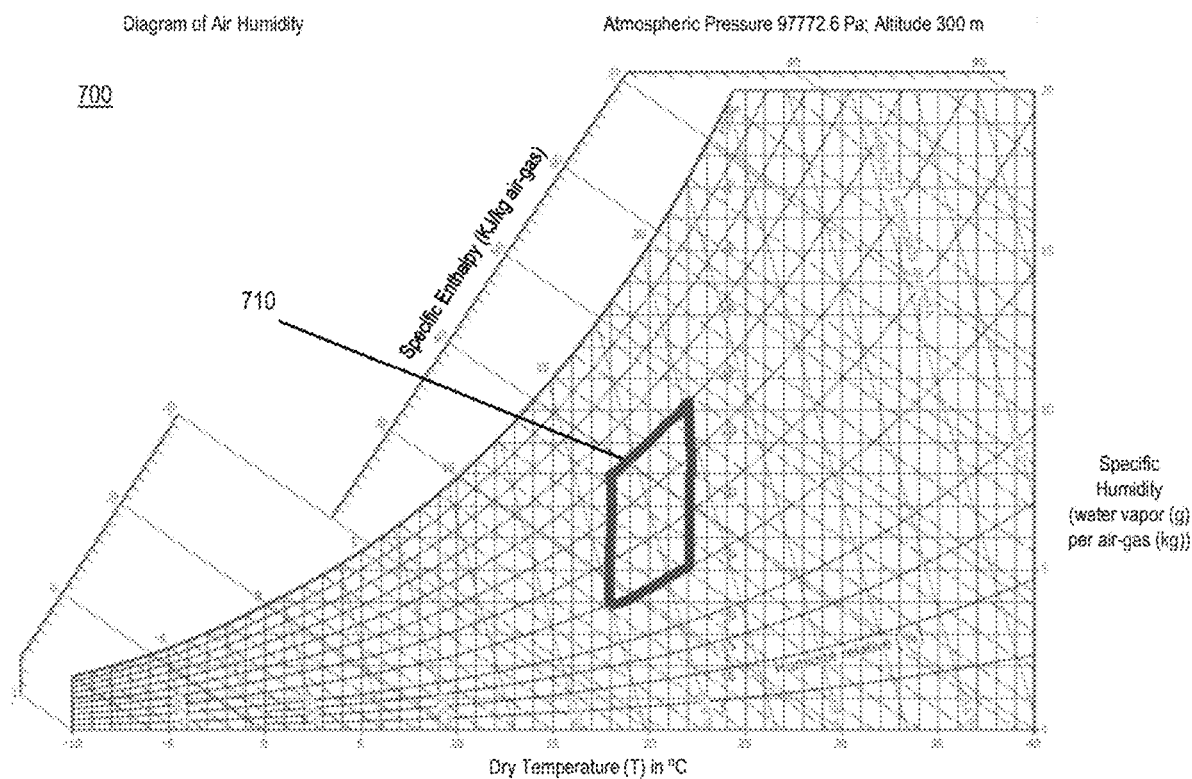
FIGS. 7, 8, 9 and 10 illustrate an example implementation of the free-cooling process which is explained using illustrative air humidity versus air temperature diagrams, in accordance with an embodiment of the present disclosure.

For example, as shown by the diagram 700 of FIG. 7, the control system can receive a comfort zone 710 and its set point(s) for a room(s)/space(s). The comfort zone and its set point(s) can be defined by a user or defined according to an environmental schedule for the room(s)/space(s). In this example, the comfort zone 710 or its set point(s) defines an expected temperature (T) range and relative humidity (RH) range, as shown by the rectangle on the diagram. The comfort zone has, for example, a temperature range of 18 to 20° C. and a relative humidity range of 30% to 60%.

Figure 8:
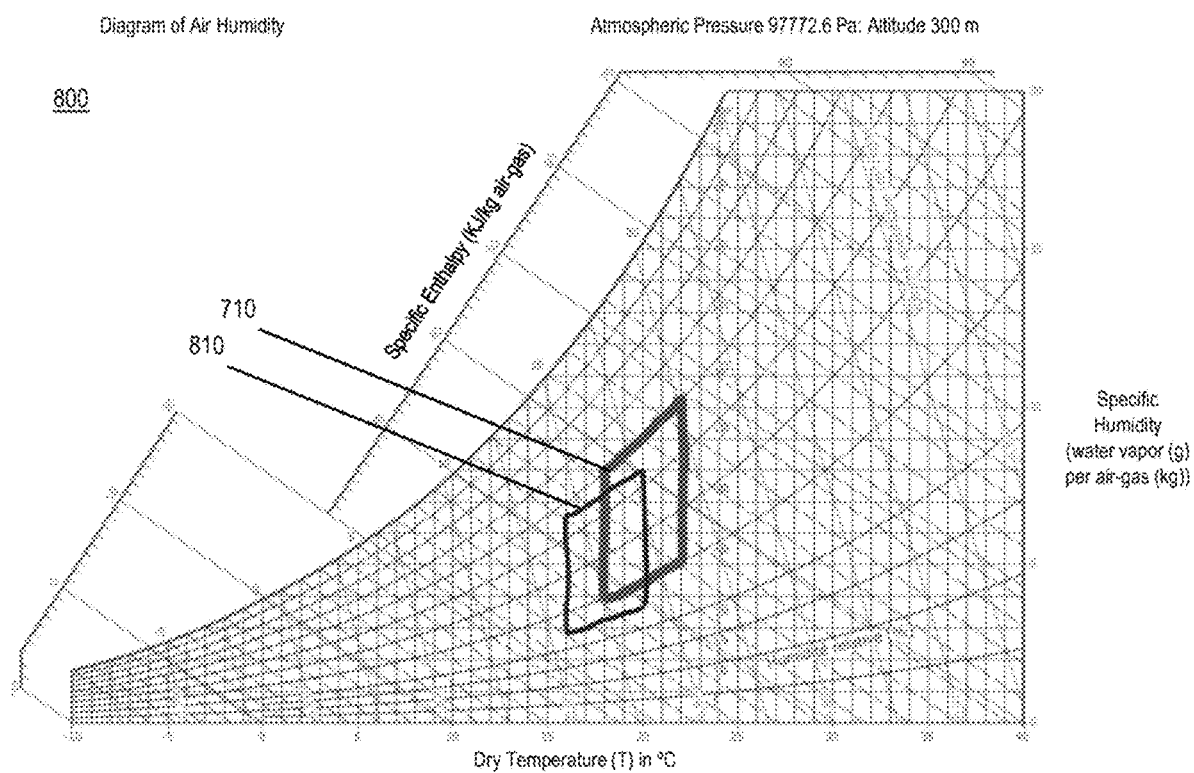

As shown by the diagram 800 of FIG. 8, the control system can compute the set point(s) of the comfort supply zone 810 and its set point(s) based on at least the specified comfort zone or its set point(s). The comfort supply zone and its set point(s) can be computed with an air supply model(s). In this example, the comfort supply zone 810 or its set point(s) defines an expected temperature (T) range and relative humidity (RH) range of an air supply from the AHU, as shown by the other rectangle on the diagram. The comfort supply zone has, for example, a temperature range of 16 to 18° C. and a relative humidity range of 25% to 55%.

Figure 9:
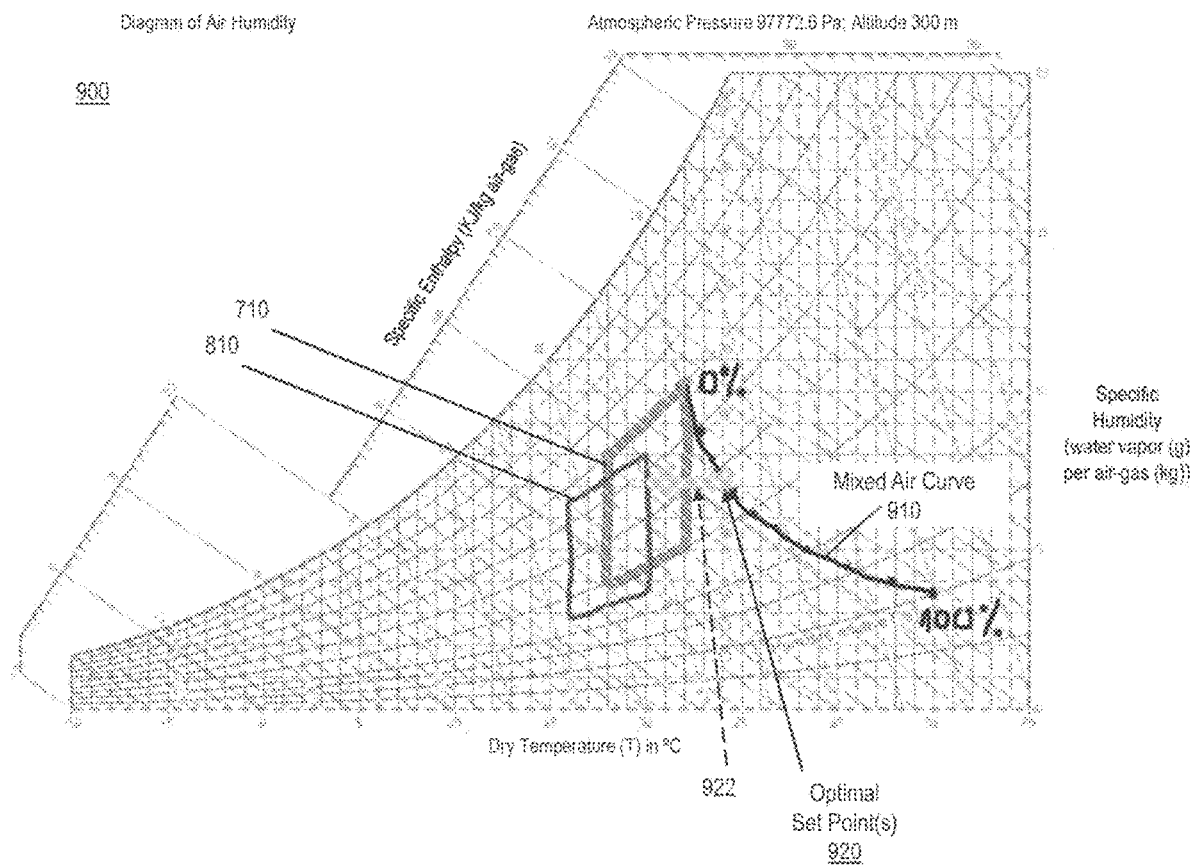
Figure 10:
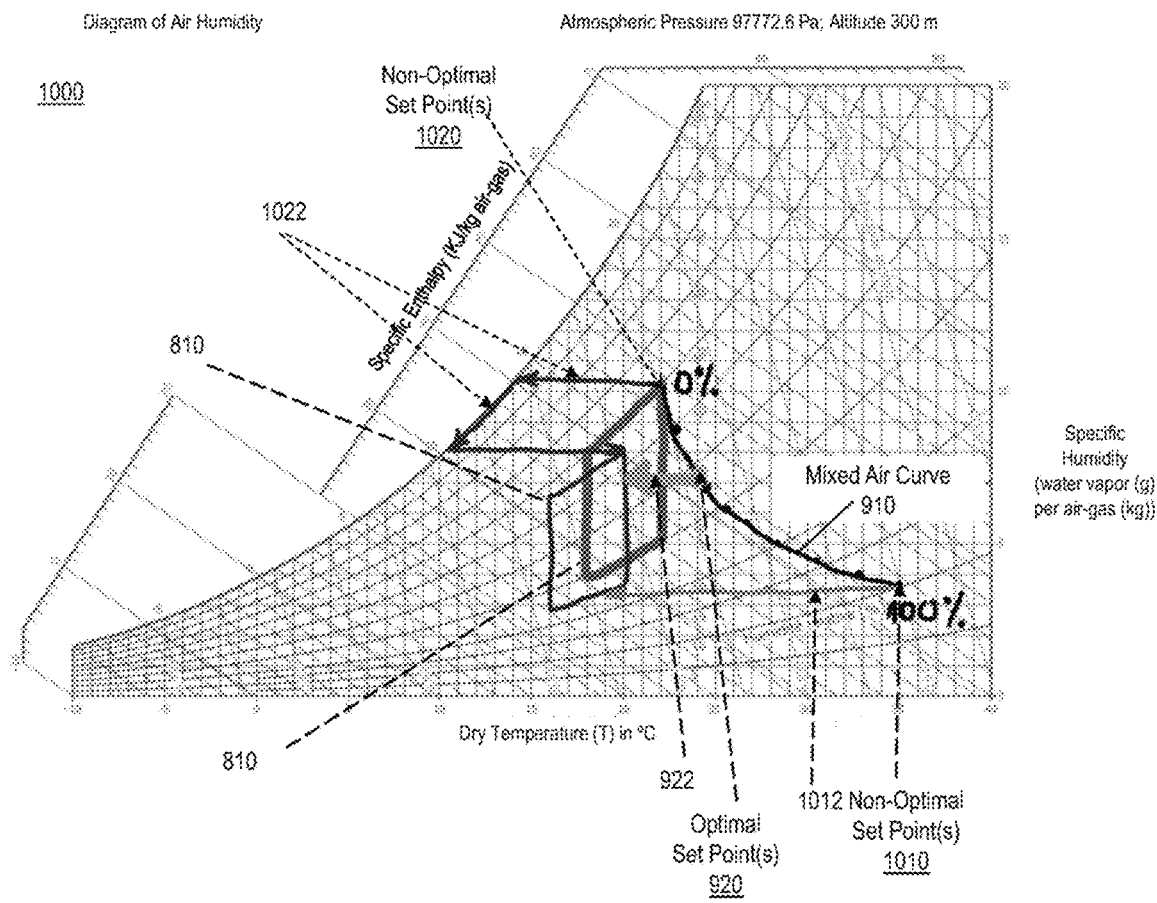

As shown by the diagram 900 of FIG. 9, the control system can monitor/measure environmental conditions of the available fresh air and the available recycled air. The monitored/measured environmental conditions can, for example, include temperature (T), relative humidity (RH) and flow rate. The control system can select, compute, derive or determine a mixed air curve 910 (e.g., 0% to 100%) according to the monitored/measured environmental conditions of the available fresh air and the available recycled air. The computer system can determine an optimal set point(s) 920, which is the optimal supply point from the mixed air curve 910 that is nearest to the set point(s) of the comfort supply zone 810. The optimal set point(s) 920 correspond to the supply point on the mixed curve 920 which has the minimum distance to the set point(s) of the comfort supply zone 810, as shown by the minimum energy consumption path 922. In this example, the free-cooling process calculates around 23% (of damper) as the convergent point needed to realize the set point(s) with a minimum thermal consumption. In comparison, as further shown in diagram 1000 of FIG. 10, non-optimal set point(s) 1010 (e.g., 100%) and 1020 (e.g., 0%) on the mixed air curve 910 result in higher energy consumption paths 1012 and 1022, respectively, to reach the comfort supply zone 810.

Once the optimal set point(s) is determined, the control system can thereafter control the AHU or a component thereof, such as an air flow control device (e.g., damper(s), thermal exchanger, etc.) to produce mixed air at the optimal set point(s) 920, which is nearest to the comfort supply zone. The control system can further control energy consuming components, such as for example the heating battery or cooling battery, to heat and/or cool the mixed air to the comfort supply zone as shown by the energy consumption path 922.

In operation, there may be changes in the operating environment, which would cause the control system to adaptively change and update the free-cooling process. For example, if the comfort zone and its set point(s) have changed (e.g., a change in the T set point(s) or RH set point(s)), then the control system can start the free-cooling process again from the beginning. If the environmental conditions of the available fresh air or the available recycled air have changed, then the control system can determine a new optimal set point(s) for the mixed air and control air processing accordingly. If the nearest supply point (T° C., RH) is different from the previous supply point, then the control system can impose the new supply point because it will consume less energy.

Figure 11:
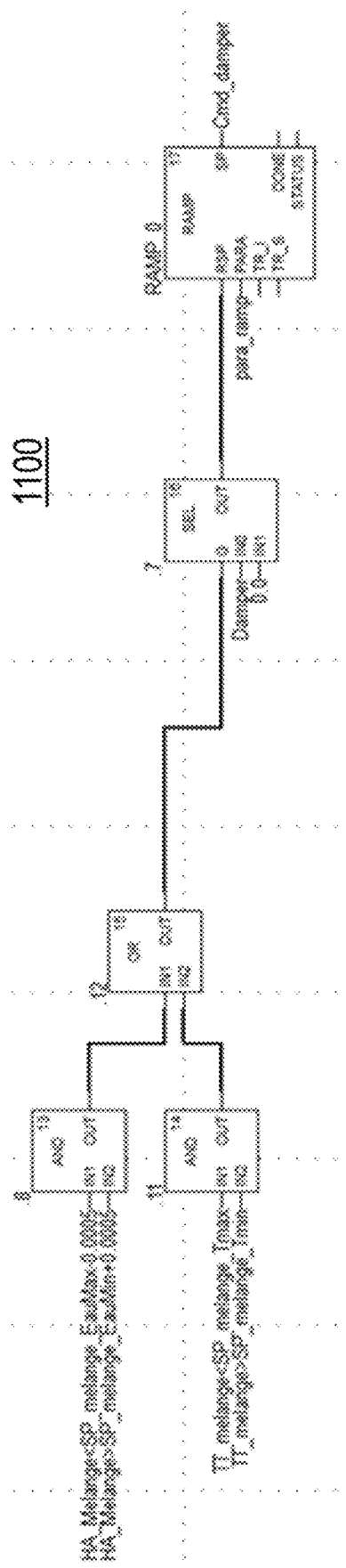
FIG. 11 is a functional block diagram of a ramping control process for controlling an air flow control device, such as a damper, to a desired mixed air supply set point(s), in accordance with an embodiment of the present disclosure.

In various examples, the control system can increase or decrease the air mixture ratio of the mixed air, via the air flow control device of the AHU until the environmental conditions, such as temperature and relative humidity of the mixed air reaches or satisfies the optimal set point(s). In one example, a simple ramping control process can be implemented, which can initially set a damper for the available fresh air to 0% (fully closed) or 100% (fully opened), and thereafter increase or decrease the air mixture ratio by opening or closing the damper door, little by little with a continuous ramping profile, until the environmental conditions of the mixed air reaches the optimal set point(s). A feedback of the monitored environmental conditions of the mixed air supply can stop the convergence when the mixed air is nearest to the comfort supply zone. For example, a configurable ramp opens or closes a fresh air damper little by little until the mixed air is at the optimal set point(s). A functional block diagram of an example ramping control process 1100 is shown using AND gates, OR gate, Selector and a Ramp in the example of FIG. 11.

Figure 12:
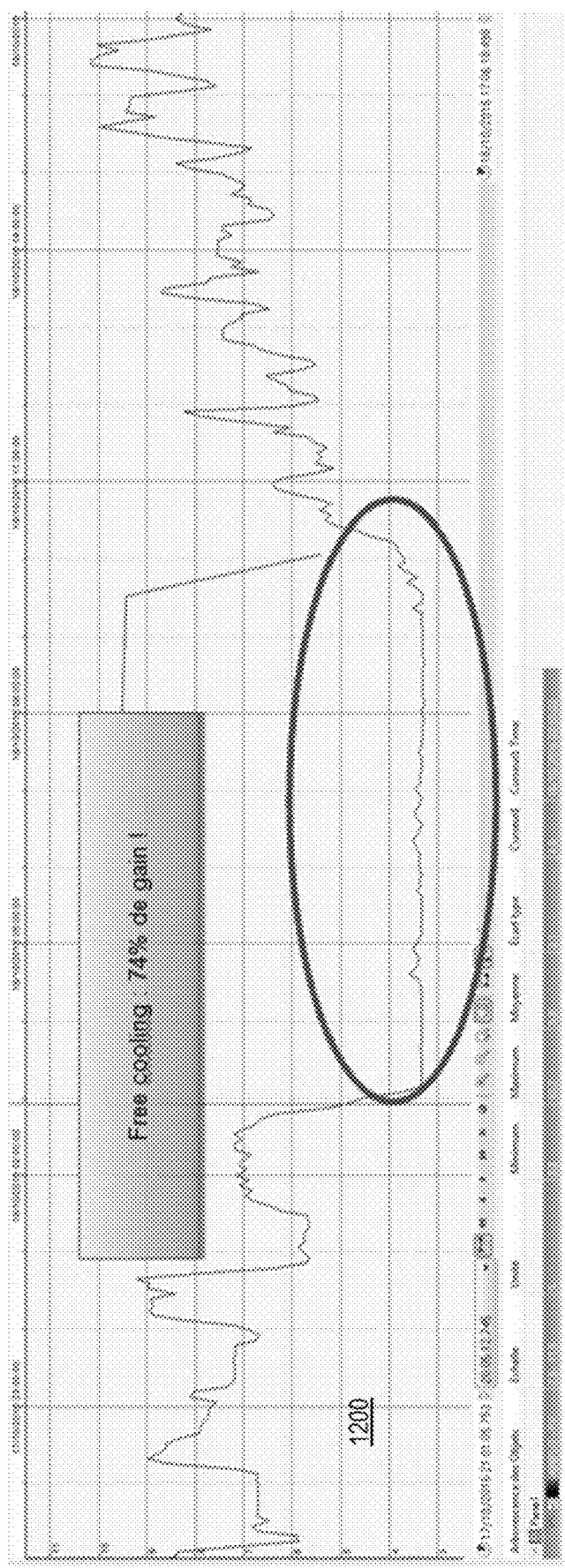
FIG. 12 is a graph showing a simulation of energy usage/consumption over time by an AHU controlled using the free-cooling process, in accordance with an embodiment of the present disclosure.

FIG. 12 is a graph 1200 showing a simulation of energy usage/consumption over time by an AHU controlled using the free-cooling process, in accordance with an embodiment of the present disclosure. As shown on the graph 1200, between 2:00 am and 8:00 am, the existing fresh air (free-cooling) can be used to avoid up to 74% energy consumption because cooling and/or heating from the AHU does not need to be used to achieve the expected comfort zone of a room(s)/space(s) or the expected comfort supply zone for the air supply from the AHU.

Figure 13:
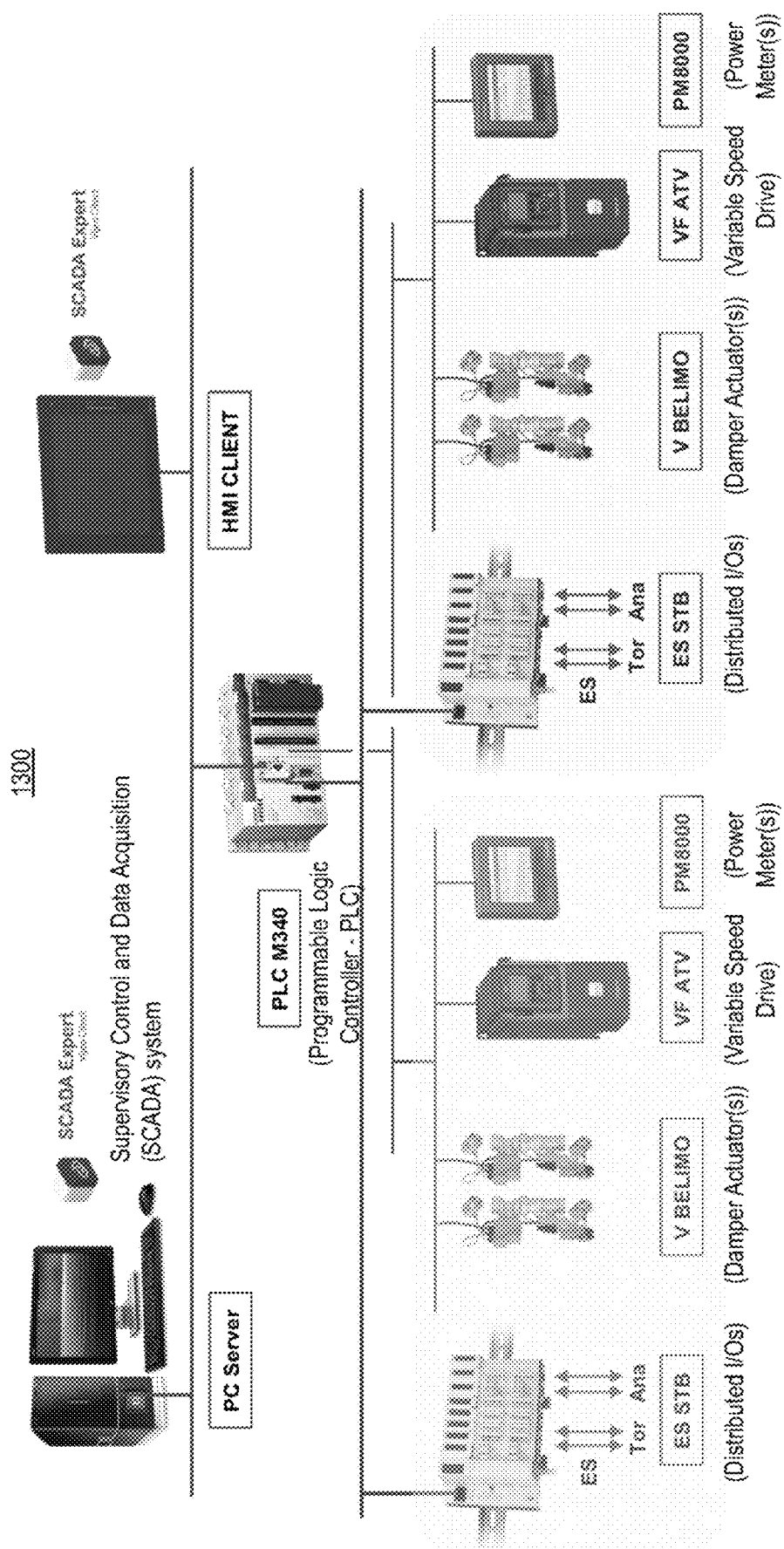
FIG. 13 illustrates an example system architecture for an industrial process with a control system which incorporates the free-cooling process, in accordance with an embodiment of the present disclosure.

FIG. 13 illustrates example system architecture 1300 for an industrial process, which includes a control system that implements the free-cooling process. In this example, the programmable logic controller (PLC) of a SCADA system can be used to control the free-cooling process in combination with damper actuators, and can control other operations and components of the industrial process.

It should also be understood that the example embodiments disclosed and taught herein are susceptible to numerous and various modifications and alternative forms. Thus, the use of a singular term, such as, but not limited to, "a" and the like, is not intended as limiting of the number of items. Furthermore, the naming conventions for the various components, functions, characteristics, thresholds, and other elements used herein are provided as examples, and can be given a different name or label. The use of the term "or" is not limited to exclusive "or", but can also mean "and/or".

It will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

Using the description provided herein, the example embodiments may be implemented as a machine, process, or article of manufacture by using standard programming and/or engineering techniques to produce programming software, firmware, hardware or any combination thereof.

Any resulting program(s), having computer-readable program code, may be embodied on one or more tangible or non-transitory computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable or storage medium or in any transmitting medium which transmits such a program.

A processor(s) or controller(s) as described herein can be a processing system, which can include one or more processors, such as CPU, controller, or other processing unit or circuitry, which controls or performs the operations of the devices or systems, described herein. The processor(s) or controller(s) can communicate with memory/storage devices, which can store computer program(s) or application(s) (e.g., software, firmware, etc.), control or other parameter(s) and/or any other data for use in implementing the method and system described herein. Memory/storage devices can include, but are not limited to, disks, solid state drives, optical disks, removable memory devices such as smart cards, SIMS, WIMs, semiconductor memories such as RAM, ROM, PROMS, etc. Transmitting mediums or networks include, but are not limited to, transmission via wireline communication, wireless communication (e.g., Radio Frequency (RF) communication, Bluetooth®, Wi-Fi, Li-Fi, etc.), the Internet, intranets, telephone/modem-based network communication, hard-wired/cabled communication network, satellite communication, and other stationary or mobile network systems/communication links.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments and applications of the present disclosure have been illustrated and described, it is to be understood that the present disclosure is not limited to the precise construction and compositions disclosed herein and that various modifications, changes, and variations can be apparent from the foregoing descriptions without departing from the invention as defined in the appended claims.

The invention claimed is:

1. A control system for controlling operations of an air handling unit or a component(s) thereof, comprising:
    memory; and
    at least one processor configured to:
        receive a first set point(s) of a comfort zone for defining expected environmental conditions for at least one room/space;
        determine a second set point(s) of a comfort supply zone of an air supply according to at least the first set point(s) for the at least one room/space, the comfort supply zone defining expected environmental conditions for the air supply to be output from the air handling unit;
        receive information relating to environmental conditions of available fresh air and available recycled air; and
        control the air handling unit or a component thereof to combine the available fresh air and the available recycled air to produce an air mixture of the available fresh air and the available recycled air at an air mixture ratio having environmental conditions which are nearest to the second set point(s), based on the received information.

2. The control system according to claim 1, wherein the at least one processor is further configured to:
    determine a third set point(s) of an air mixture of fresh air and recycled air, the third set point(s) corresponding to the air mixture ratio for the air mixture having environmental conditions that are nearest to the comfort supply zone,
    wherein the at least one processor controls the air handling unit or component thereof to combine the available fresh air and the available recycled air to produce the air mixture of the fresh air and the recycled air at the third set point(s).

3. The control system according to claim 2, wherein the at least one processor determines the third set point(s) based on an analysis of a mixed air curve with respect to the comfort supply zone, the mixed air curve being determined, selected or derived according to the environmental conditions of the available fresh air and the available recycled air, the third set point(s) corresponding to an optimal supply point on the mixed air curve that is nearest to the second set point(s) of the comfort supply zone.

4. The control system according to claim 2, wherein the amount of available fresh air to be combined with the available recycled air is increased or decreased until the air mixture reaches the third set point(s), or the amount of recycled air to be combined with the available fresh air is increased or decreased until the air mixture reaches the third set point(s).

5. The control system according to claim 2, wherein the at least one processor is further configured to:
    update the third set point(s) in response to changes in at least one of the comfort zone of the at least one room/space, the comfort supply zone, the available fresh air, and/or the available recycled air; and
    in response to the updated third set point(s), control the air handling unit or component thereof to combine the available fresh air and the available recycled to produce the air mixture at the updated third set point(s).

6. The control system according to claim 1, wherein the amount of available fresh air to be combined with the available recycled air is increased or decreased until the air mixture has environmental conditions which are nearest to the second set point(s), or the amount of recycled air to be combined with the available fresh air is increased or decreased until the air mixture has environmental conditions which are nearest to the second set point(s).

7. The control system according to claim 1, wherein the environmental conditions, associated with the first set point(s) or comfort zone, the second set point(s) or comfort supply zone, the available fresh air, the available recycled air and/or the air mixture, comprise: at least a temperature and a relative humidity.

8. The control system according to claim 1, wherein the at least one processor is further configured to receive, determine, calculate, estimate or derive information relating to environmental conditions of the air mixture, and wherein the at least one processor controls the air handling unit or a component thereof to combine the available fresh air and the available recycled air to produce the air mixture at an air mixture ratio having environmental conditions which are nearest to the second set point(s), based on the received information and the received, determined, calculated or derived information relating to environmental conditions of the air mixture.

9. The control system according to claim 1, wherein the at least one processor determines the second set point(s) by computing the second set point(s) according to an air supply model and the first set point(s) of the comfort zone.

10. The control system according to claim 1, wherein the at least one processor controls an operation of an air damper or thermal exchanger of the air handling unit to control the air mixture ratio of the available fresh air and the available recycled air to be combined.

11. The control system according to claim 1, wherein the air mixture is heated and/or cooled by the air handling unit to produce a supply of air at the second set point(s) for the at least one room/space.

12. The control system according to claim 1, wherein the comfort zone or the first set point(s) is set by a user, or set according to an environmental schedule for the at least one room/space.

13. An environmental management system for controlling environmental conditions for at least one room/space, comprising:
an air handling unit for supplying air to the at least one room/space; and
the control system according to claim 1.

14. A computer-implemented method of controlling operations of an air handling unit or a component(s) thereof, comprising:
receiving a first set point(s) of a comfort zone for defining expected environmental conditions for at least one room/space;
determining a second set point(s) of a comfort supply zone of an air supply according to at least the first set point(s) for the at least one room/space, the comfort supply zone defining expected environmental conditions for the air supply to be output from the air handling unit;
receiving information relating to environmental conditions of available fresh air and available recycled air; and
controlling the air handling unit or a component thereof to combine the available fresh air and the available recycled air to produce an air mixture of the available fresh air and the available recycled air at an air mixture ratio having environmental conditions which are nearest to the second set point(s), based on the received information.

15. The method according to claim 14, further comprising:
determining a third set point(s) of the air mixture of fresh air and recycled air, the third set point(s) corresponding to the air mixture ratio for an air mixture having environmental conditions that are nearest to the comfort supply zone,
wherein the air handling unit or component thereof is controlled to combine the available fresh air and the available recycled air to produce the air mixture of the fresh air and the recycled air at the third set point(s).

16. The method according to claim 15, wherein the third set point(s) is determined based on an analysis of a mixed air curve with respect to the comfort supply zone, the mixed air curve being determined, selected or derived according to the environmental conditions of the available fresh air and the available recycled air, the third set point(s) corresponding to an optimal supply point on the mixed air curve that is nearest to the second set point(s) of the comfort supply zone.

17. The method according to claim 15, wherein the amount of available fresh air to be combined with the available recycled air is increased or decreased until the air mixture reaches the third set point(s), or the amount of recycled air to be combined with the available fresh air is increased or decreased until the air mixture reaches the third set point(s).

18. The method according to claim 15, further comprising:
updating the third set point(s) in response to changes in at least one of the comfort zone of the at least one room/space, the comfort supply zone, the available fresh air, and/or the available recycled air; and
in response to the updated third set point(s), controlling the air handling unit or component thereof to combine the available fresh air and the available recycled to produce the air mixture at the updated third set point(s).

19. The method according to claim 14, wherein the amount of available fresh air to be combined with the available recycled air is increased or decreased until the air mixture has environmental conditions which are nearest to the second set point(s), or the amount of recycled air to be combined with the available fresh air is increased or decreased until the air mixture has environmental conditions which are nearest to the second set point(s).

20. The method according to claim 14, wherein the environmental conditions, associated with the first set point(s) or comfort zone, the second set point(s) or comfort supply zone, the available fresh air, the available recycled air and/or the air mixture, comprise: at least a temperature and a relative humidity.

21. The method according to claim 14, further comprising: receiving, determining, calculating, estimating or deriving information relating to environmental conditions of the air mixture,
wherein the controlling controls the air handling unit or a component thereof to combine the available fresh air and the available recycled air to produce the air mixture at an air mixture ratio having environmental conditions which are nearest to the second set point(s), based on the received information and the received, determined, calculated or derived information relating to environmental conditions of the air mixture.

22. The method according to claim 14, wherein the second set point(s) is determined by computing the second set point(s) according to an air supply model and the first set point(s) of the comfort zone.

23. The method according to claim 14, wherein the controlling controls an operation of an air damper or thermal exchanger of the air handling unit to control the air mixture ratio of the available fresh air and the available recycled air to be combined.

24. The method according to claim 14, wherein the air mixture is heated and/or cooled by the air handling unit to produce a supply of air at the second set point(s) for the at least one room/space.

25. The method according to claim 14, wherein the comfort zone or the first set point(s) is set by a user, or set according to an environmental schedule for the at least one room/space.

26. A non-transitory computer medium storing computer executable code, which when executed by one or more processors, is configured to implement a method of controlling operations of an air handling unit or a component(s) thereof, the method comprising:
- receiving a first set point(s) of a comfort zone for defining expected environmental conditions for at least one room/space;
- determining a second set point(s) of a comfort supply zone of an air supply according to at least the first set point(s) for the at least one room/space, the comfort supply zone defining expected environmental conditions for the air supply to be output from the air handling unit;
- receiving information relating to environmental conditions of available fresh air and available recycled air; and
- controlling the air handling unit or a component thereof to combine the available fresh air and the available recycled air to produce an air mixture of the available fresh air and the available recycled air at an air mixture ratio having environmental conditions which are nearest to the second set point(s), based on the received information.

* * * * *